US012156032B2

United States Patent
You et al.

(10) Patent No.: US 12,156,032 B2
(45) Date of Patent: Nov. 26, 2024

(54) METHOD AND DEVICE FOR PREVENTING USER TRACKING, STORAGE MEDIUM AND ELECTRONIC DEVICE

(71) Applicant: ZTE Corporation, Guangdong (CN)

(72) Inventors: Shilin You, Guangdong (CN); Zhenhua Xie, Guangdong (CN); Jin Peng, Guangdong (CN); Wantao Yu, Guangdong (CN); Zhaoji Lin, Guangdong (CN)

(73) Assignee: ZTE Corporation, Shenzhen (CN)

( * ) Notice: Subject to any disclaimer, the term of this patent is extended or adjusted under 35 U.S.C. 154(b) by 662 days.

(21) Appl. No.: 17/375,829

(22) Filed: Jul. 14, 2021

(65) Prior Publication Data

US 2021/0345116 A1   Nov. 4, 2021

Related U.S. Application Data

(63) Continuation of application No. PCT/CN2019/071727, filed on Jan. 15, 2019.

(51) Int. Cl.
*H04W 12/122*   (2021.01)
*H04W 12/03*   (2021.01)
*H04W 12/0431*   (2021.01)
*H04W 12/06*   (2021.01)
*H04W 12/75*   (2021.01)

(52) U.S. Cl.
CPC ......... *H04W 12/122* (2021.01); *H04W 12/03* (2021.01); *H04W 12/0431* (2021.01); *H04W 12/06* (2013.01); *H04W 12/75* (2021.01)

(58) Field of Classification Search
CPC ............... H04W 12/122; H04W 12/03; H04W 12/0431; H04W 12/06; H04W 12/75;
(Continued)

(56) References Cited

U.S. PATENT DOCUMENTS

2002/0120844 A1*  8/2002  Faccin ............... H04W 12/06
                                                        713/168
2006/0095959 A1*  5/2006  Williams ............ H04W 12/06
                                                        726/8
(Continued)

FOREIGN PATENT DOCUMENTS

CN        101127600 A       2/2008
CN        103533528 A       1/2014
(Continued)

OTHER PUBLICATIONS

Behrad et al., "Securing Authentication for Mobile Networks, A Survey on 4G issues and 5G answers", Feb. 2018, 21st Conference on Innovation in Clouds, Internet and Networks and Workshops, pp. 1-8 (Year: 2018).*

(Continued)

*Primary Examiner* — Kenneth W Chang
(74) *Attorney, Agent, or Firm* — Perkins Coie LLP

(57) ABSTRACT

Methods, systems, and devices related to related to digital wireless communication, and more specifically, to techniques related to securing a user authentication procedure. In one exemplary aspect, a method for wireless communication includes transmitting an authentication message from a network node. The method also includes determining a failure value indicating a reason for failure of the authentication message. The method also includes encrypting the failure value and an identifier. The method also includes transmitting an encrypted response message to the network node. In another exemplary aspect, a method for wireless communication includes transmitting an authentication message to a terminal. The method also includes receiving an encrypted response message from the terminal. The method also includes decrypting the encrypted response message to determine the failure value and the indicator.

20 Claims, 7 Drawing Sheets

(58) Field of Classification Search
CPC .............. H04W 12/037; H04W 12/041; H04L 2209/80; H04L 9/0844; H04L 9/3242; H04L 63/0876

See application file for complete search history.

(56) References Cited

U.S. PATENT DOCUMENTS

| | | | | |
|---|---|---|---|---|
| 2006/0209798 | A1* | 9/2006 | Oikarinen | H04W 76/19 370/465 |
| 2007/0037577 | A1* | 2/2007 | Dalsgaard | H04W 48/18 455/433 |
| 2010/0064344 | A1* | 3/2010 | Wang | H04W 12/04 380/44 |
| 2012/0311335 | A1* | 12/2012 | Fransen | H04L 9/3273 713/170 |
| 2019/0246275 | A1* | 8/2019 | Nakarmi | H04W 12/069 |

FOREIGN PATENT DOCUMENTS

| | | |
|---|---|---|
| CN | 104185178 A | 12/2014 |
| CN | 104901803 A | 9/2015 |
| CN | 108809903 A | 11/2018 |
| CN | 108880813 A | 11/2018 |
| WO | 2018/017013 A1 | 1/2018 |

OTHER PUBLICATIONS

CNIPA, Notification to Complete Formalities of Registration for Chinese Application No. 201980088792.3, mailed on Jan. 28, 2023, 6 pages with unofficial translation.

International Search Report and Written Opinion mailed on Oct. 22, 2019 for International Application No. PCT/CN2019/071727, filed on Jan. 15, 2019 (7 pages).

CNIPA, Second Office Action for Chinese Application No. 2019800887923, mailed on Sep. 16, 2022, 6 pages with unofficial translation.

European Search Report for EP Patent Application No. 19910006.6, dated Dec. 9, 2021, 9 pages.

ZTE Corporation: "Solution for linkability issue", 3GPP Draft; S3-190162 Eauth-Linkability Solution, 3rd Generation Partnership Project (3GPP), Mobile Competence Centre; 650, Route Des Lucioles; F-06921 Sophia-Antipolis Cedex; France vol. SA WG3, No. Kochi (India); Jan. 28-Feb. 1, 2019, Jan. 21, 2019 (Jan. 21, 2019), XP051611432, Retrieved from the Internet: URL:http://www.3gpp.org/ftp/tsg%5Fsa/WG3%5FSecurity/TSGS3%5F94%5FKochi/Docs/S3%2D190162%2Ezip [retrieved on Jan. 21, 2019].

"3rd Generation Partnership Project; Technical Specification Group Services and System Aspects; 3G Security; Security architecture (Release 15)", 3GPP Standard; Technical Specification; 3GPP TS 33.102, 3rd Generation Partnership Project (3GPP), Mobile Competence Centre; 650, Route Des Lucioles ; F-06921 Sophia-Antipolis Cedex; France, vol. SA WG3, No. V15.1.0, Dec. 18, 2018 (Dec. 18, 2018), pp. 1-77, XP051591194, [retrieved on Dec. 18, 2018].

"3rd Generation Partnership Project; Technical Specification Group Services and System Aspects; Security architecture and procedures for 5G system (Release 15)", 3GPP Standard; Technical Specification; 3GPP TS 33.501, 3rd Generation Partnership Project (3GPP), Mobile Competence Centre; 650, Route Des Lucioles ; F-06921 Sophia-Antipolis Cedex; France, No. VI5.3.1, Dec. 31, 2018 (Dec. 31, 2018), pp. 1-181, XP051591577.

\* cited by examiner

METHOD AND DEVICE FOR PREVENTING USER TRACKING, STORAGE MEDIUM AND ELECTRONIC DEVICE

CROSS-REFERENCE TO RELATED APPLICATIONS

This application is a continuation of and claims priority to International Patent Application No. PCT/CN2019/071727, filed on Jan. 15, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to securing a user authentication process.

In one exemplary aspect, a method for wireless communication is disclosed. The method includes receiving an authentication request from a network node, wherein the authentication request includes an authentication identifier (AUTN) and a random number (RAND). The method also includes determining a failure value indicating a reason for failure of the authentication message. The method also includes encrypting the failure value and the identifier. The method also includes transmitting an encrypted response message to the network node, wherein the response message includes the encrypted failure value the identifier.

In another exemplary aspect, a method for wireless communication is disclosed. The method includes transmitting an authentication request to a terminal, wherein the authentication request includes an authentication identifier (AUTN) and a random number (RAND). The method also includes receiving an encrypted response message from the terminal, wherein the response message includes an encrypted failure value indicating a reason for failure of the authentication message and an encrypted indicator. The method also includes decrypting the encrypted response message to determine the failure value and the indicator.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
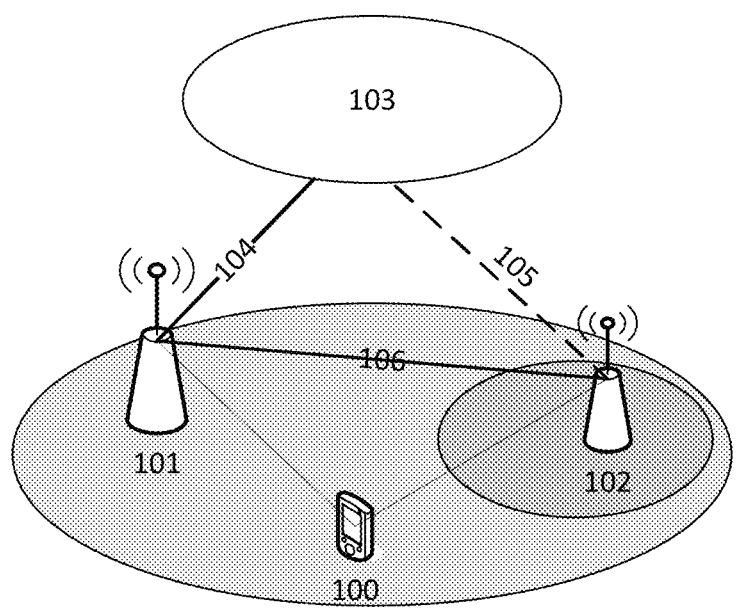
FIG. 1 shows an exemplary schematic diagram of a system architecture for Dual Connectivity (DC).

As NR emerges in the wireless domain, UEs will be capable of supporting both protocols at the same time. FIG. 1 shows an exemplary schematic diagram of a system architecture for Dual Connectivity (DC). The current base station (referred to as the first network element 81) in the core network 103 may select a suitable base station for the UE 80 to function as the second network element 82. For example, the suitable based station can be selected by comparing the channel quality of the base station with a predetermined threshold. Both base stations can provide radio resources to the UE 80 for data transmission on the user plane. On the wired interface side, the first network element 81 and the core network 103 establish a control plane interface 104 for the UE 80. The second network element 82 and the core network 103 may establish a user plane interface 105 for the UE 80. An interface 106 (e.g., Xn interface) inter-connects the two network elements. On the wireless interface side, the first and the second network elements (81 and 82) may provide radio resources using the same or different Radio Access Technologies (RATs). Each of the network element can schedule transmissions with the UE 80 independently. The network element that has a control plane connection to the core network is referred to as the master node (e.g., the first network element 81), and the network element that has only a user plane connection with the core network is referred to as the secondary node (e.g., the second network element 82). In some cases, the UE 80 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

This patent document describes techniques that can be implemented to secure a user authentication procedure and prevent tracking of terminal devices. The 3GPP has developed specifications for various mobile networks, including an Authentication and Key Agreement (AKA process), which relates to the mutual interaction between a terminal (or UE) and a network to authenticate and establish a common key.

Figure 2:
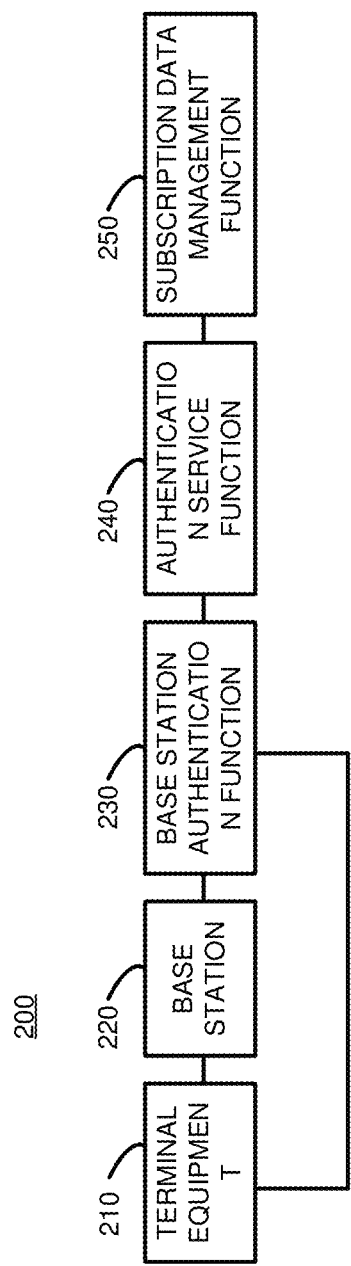
FIG. 2 is a schematic structural diagram of a mobile system.

FIG. 2 is a schematic structural diagram of a mobile system 200. A base station (or eNB, gNB) 220 may transmit information or services received from the mobile network to a terminal 210. The authentication function (e.g., base station authentication function 230) may include a function or a hardware device of the core network. The authentication function may communicate with the base station using signaling so that a mobile terminal (terminal 210) can implement mutual authorization, such as MME (Mobility Management Entity), SEAF (Security Anchor Function), AMF (Access and Mobility Management Function), etc.

The authentication service function 240 may obtain user-related content using a signaling interface with the subscription data management function 250. Information relating to a key (or "key information") may be provided to the authentication service function 240 via the signaling interface, where the authentication service function 240 may include an authentication server function (AUSF). The authentication service function 240 may be included with the subscription data management function 250. The subscription data management function 250 may store and process user-related content. Information for authenticating a user and the key information related to the user may be generated and transmitted to the authentication service function 240 through a signaling interface, which may include a UDM (User Data Management), an HSS (Home Subscriber Server), etc.

Figure 3:
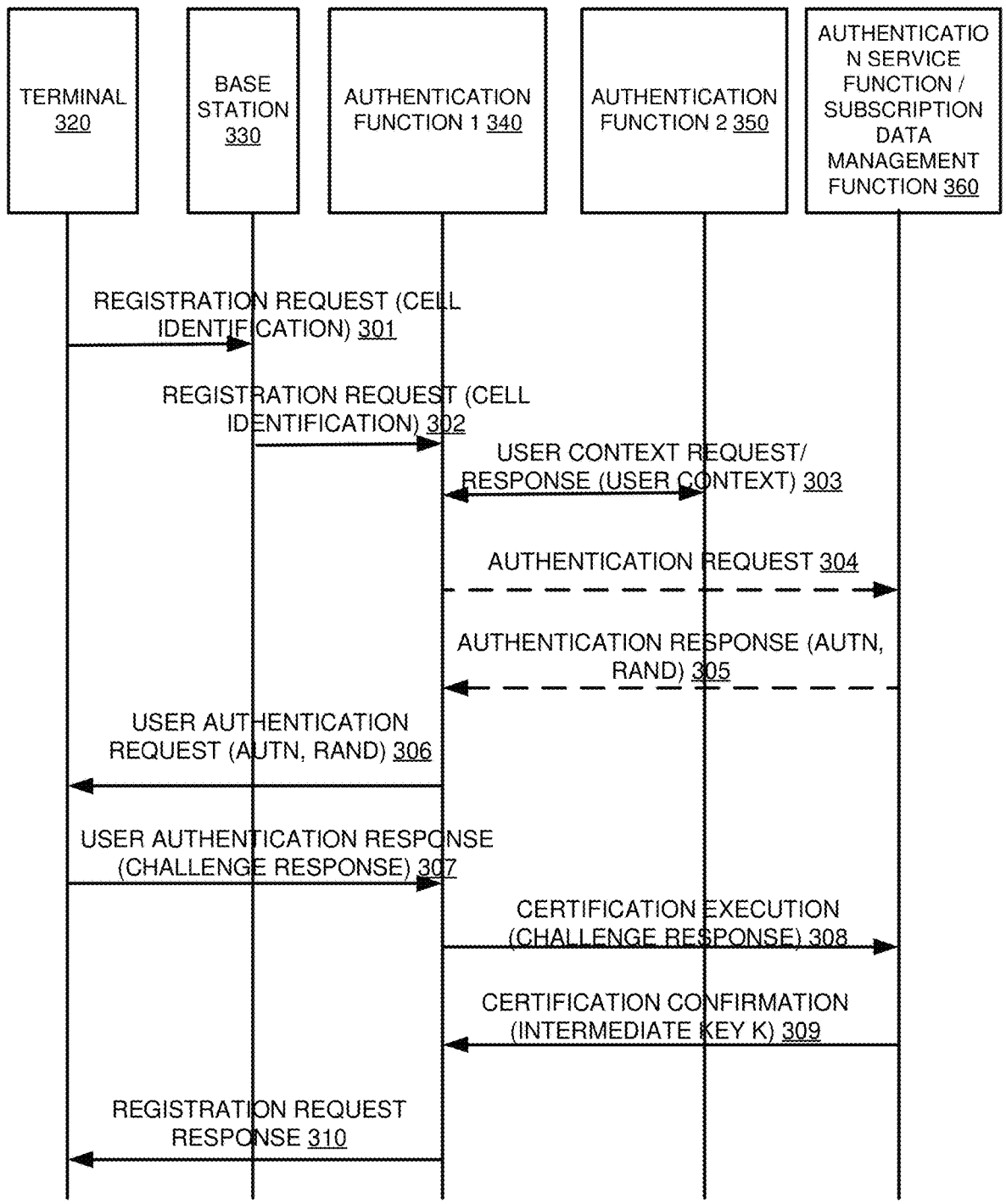
FIG. 3 illustrates a signaling process for AKA authentication.

FIG. 3 illustrates a signaling process 300 for AKA authentication. In Step 301, A terminal 320 may transmit a registration request to the base station 330. The registration request may include at least one of a cell identifier, a user security capability, a subscriber concealed identifier (SUCI), or a 5G Globally Unique Temporary UE Identity (5G-GUTI). The subscriber concealed identifier (SUCI) may include an encrypted subscriber permanent identify (SUPI) that is encrypted using a public key.

Step 302: The base station 330 may forward the registration request to a first authentication function 340. The registration request may include at least one of a cell identifier, a user security capability, a Subscription Concealed Identifier (SUCI), or a 5G Globally Unique Temporary UE Identity (5G-GUTI).

Step 303: The first authentication function 340 may transmit a user context request to a second authentication function 350. If a user identifier (or user ID) is a user temporary identifier (or 5G-GUTI), the first authentication function 340 may initiate a user context request to the second authentication function 350 based on the user temporary identifier in a authentication management field (AMF) identity. The user context request may include a user temporary identifier (e.g., 5G-GUTI).

A user context response message may be transmitted from the second authentication function 350 to the first authentication function 340. The user context response message may be transmitted by the second authentication function 350 in response to receiving the user context request. The user context response message may include at least one of a Subscription Permanent Identifier (SUPI) and a user security context.

Step 304: The first authentication function 340 may transmit an authentication request to the authentication service function/subscription data management function 360. The authentication request may include a SUCI or SUPI. The first authentication function 340 may transmit the authentication request based on at least one of: determining that the user identifier is a SUCI, the user context request/response fails, or if an authentication function needs to initiate the AKA authentication process.

Step 305: The subscription data management function 360 may obtain the SUPI based on decrypting a SUCI using a private key. The subscription data management function 360 may query a user subscription parameter according to the SUPI and generate a home authentication vector. A home authentication vector may be represented by: (random number (RAND), authentication token (AUTN), expected response (XRES)*, and KAUSF) according to the root key K, where AUTN=(SQN$\oplus$AK)$\|$AMF$\|$MAC, where MAC=F1K(SQN$\|$RAND$\|$AMF), where XRES*=F2K (RAND), AK=F5K(RAND), where KAUSF is derived from F3K and F4K, F1K, F2K, F3K, F4K, F5K is a key derivation function of K as a key. AMF is an Authentication Management Domain Parameter (AMF). An attribution authentication vector may be represented by (RAND, AUTN, XRES*, and KAUSF) and SUPI, the authentication service function may save the attribution authentication vector and SUPI, and HXRES* is obtained by XRES* hash, and KSEAF may be derived from KAUSF, such that the authentication vectors (RAND, AUTN, HXRES*, and KSEAF) may be obtained. The subscription data management function 360 may transmit an authentication response message to the authentication function 1 340, and the message may carry the AUTN, RAND and HXRES*.

Step 306: The authentication function 1 340 may transmit a user authentication request message to the terminal 320. The user authentication request message may carry at least one of AUTN, RAND, and ngKSI.

Step 307: After receiving the RAND and the AUTN in the user authentication request message (step 306), the terminal 320 may calculate a sequence number (SQN) and an expected MAC (XMAC) according to the calculation method in step 305. The terminal 320 may verify whether the SQN in the AUTN is greater than a terminal SQN, and whether a MAC is equal to the XMAC ("MAC=XMAC"). After at least one of the SQN and the XMAC is verified/authenticated, a RES* may be calculated. The authentication function 1 340 may receive a user authentication request response message from the terminal 320, and the message may carry RES*.

Step 308: Authentication function 1 340 may derive the HRES* from the RES*, and the authentication function 1 340 may compare the HRES* and the HXRES*. If the comparison is passed, a network authentication may be successful, and a certification execution message may be transmitted to the authentication service function/subscription data management function 360. The certification execution message may include RES*.

Step 309: The authentication service function/subscription data management function 360 may compare the RES* and XRES*. If the RES* and XRES* are equal, the authentication of the home network may be deemed successful, and an authentication confirmation message may be sent to the authentication function 1 340. The authentication confirmation message may carry the SUPI and an intermediate key KSEAF.

Step 310: The authentication function 1 340 may derive an intermediate key KSEAF to generate a KAMF, and the access layer encryption key and the integrity protection key may be derived by the KAMF. A non-access layer encryption key KNAS-enc and the integrity protection key may be transmitted to the terminal 320 in a registration request response message. The authentication function may send the registration request response message 1 340 to the terminal.

In the above AKA process scheme, when the terminal 320 receives the authentication request message (step 306) from the network (e.g., authentication function 1 340), the terminal 320 may determine whether the AUTN received in the authentication request message is verified. If the verification fails, the terminal 320 may transmit a failure message, which may include the failure reason parameter (CAUSE) indicating a reason for the failure of the verification. If a MAC address of the authentication request message does not equal a XMAC, the reason for the failure may indicate a message authentication code failure (MAC Failure), indicating that the terminal authentication fails. If the MAC address is equal to the XMAC, the terminal authentication network may be determined to be successful, and the terminal re-authentication SQN may be greater than the SQN in the terminal. If the SQN is less than or equal to the terminal SQN, the reason for failure may indicate a synchronization (or "Sync") Failure.

The steps as illustrated in FIG. 3 may be implemented by an unauthorized (or "malicious") node to replay a legitimate authentication request message from a terminal. The malicious node may target the terminal by analyzing a received authentication failure message from the terminal and determining that the reason for failure is a Sync failure. The malicious node may identify the terminal based on receiving the authentication request message to determine that the terminal is located within a range of the malicious node. By replaying the authentication request message multiple times, and analyzing received authentication failure messages from a terminal, the malicious node may track a terminal, where the malicious node may detect and receive private terminal data from the terminal.

EXAMPLE EMBODIMENT 1

Figure 4:
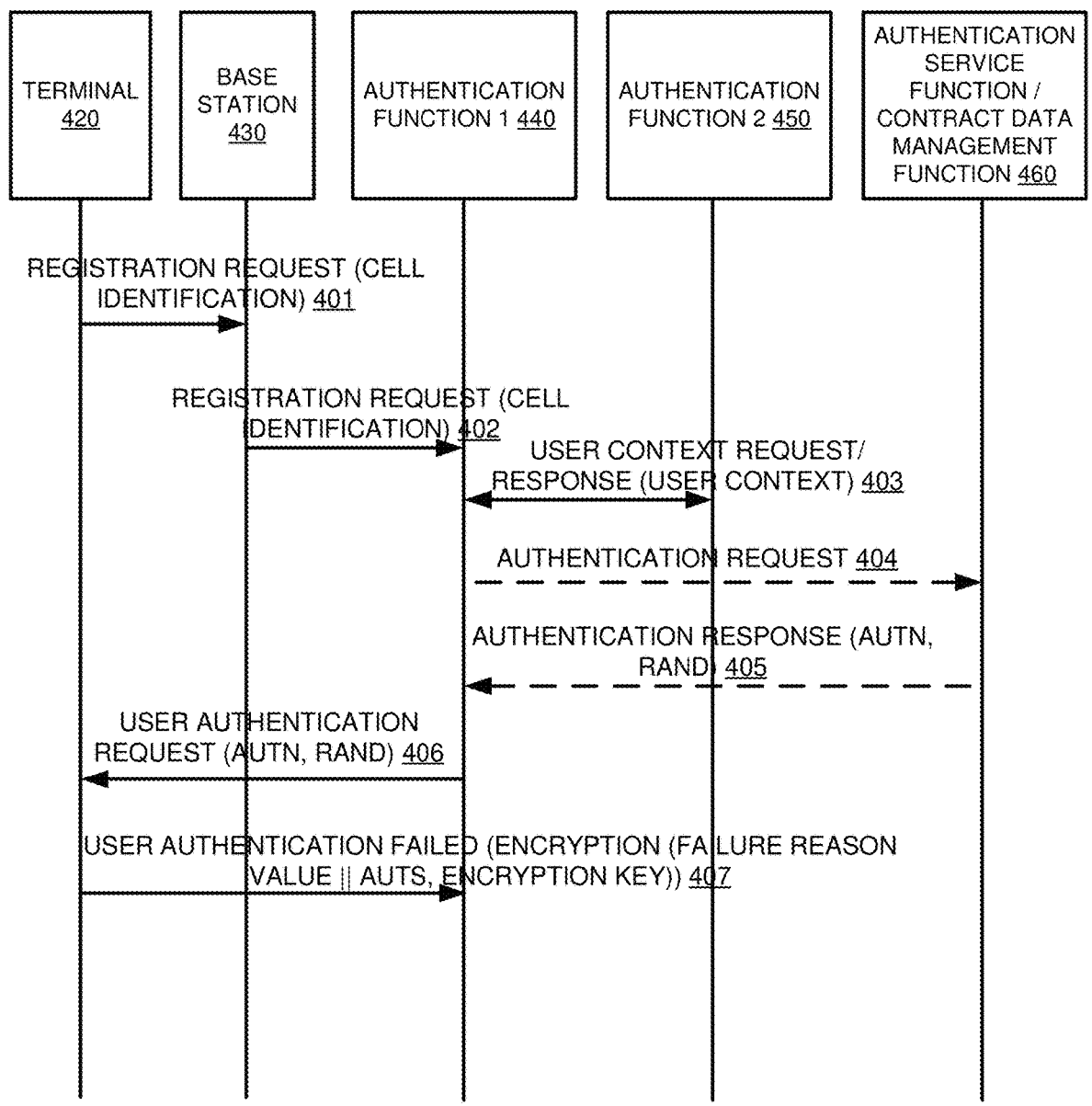
FIG. 4 illustrates a signaling process for securing a user authentication process.

FIG. 4 illustrates a signaling process of a method for securing a user authentication process. In Step 401: The terminal 430 may transmit a registration request message to a base station 430. The registration request message may carry at least one of a cell identifier, a user security capability, a Subscription Concealed Identifier (SUCI), or a 5G Globally Unique Temporary UE Identity (5G-GUTI).

Step 402: The base station 430 may forward a registration request message to the authentication function 1 440. The registration request message may carry at least one of a cell identifier, a user security capability, a SUCI, and a 5G-GUTI.

Step 403: If the user identifier is a temporary identifier of the 5G user, the authentication function 1 440 may initiate a user context request message to the authentication function 2 450 according to a AMF identifier identified from the temporary identifier of the 5G user. The user context request message may include the temporary identifier of the 5G user, and the authentication function 2 450 may transmit a user context response message to the authentication function 1 440. The user context response message may include a user context, wherein the user context includes at least a User Permanent Identity (SUPI) and a User Security Context.

Step 404: If the user identifier is a SUCI, if the registration message (Step 402) fails to successfully deliver to authentication function 1 440, or the authentication function 1 440 needs to initiate the AKA authentication process, the authentication function 1 440 may transmit an authentication request message to the authentication service function/subscription data management function 460. The authentication request message may include the SUCI or the SUPI.

Step 405: The subscription data management function 460 may identify the SUPI by decrypting the SUCI, or the subscription data management function 460 may query the user subscription parameter according to the SUPI. The subscription data management function 460 may generate a home authentication vector (RAND, AUTN, XRES*, and KAUSF) according to the root key K, where AUTN= (SQN⊕AK∥AMF∥MAC, MAC=F1K(SQN∥RAND∥AMF), XRES*=F2K (RAND), AK=F5K (RAND), KAUSF is derived from F3K and F4K, F1K, F2K, F3K, F4K, F5K is a key derivation function of K as a key, AMF is an Authentication Management Domain Parameter (AMF), and a attribution authentication vector (RAND, AUTN, XRES*, and KAUSF) and SUPI, the authentication service function may save the attribution authentication vector and SUPI, and HXRES* may be obtained by XRES* hash, and KSEAF is derived from KAUSF, such that the authentication vectors (RAND, AUTN, HXRES*, and KSEAF) may be obtained. The subscription data management function 460 may transmit an authentication request response message to the authentication function 1 440, where the message may include at least one of: AUTN, RAND and HXRES*.

Step 406: The authentication function 1 440 may transmit a user authentication request message to the terminal 420, where the message carries at least one of AUTN, RAND and ngKSI.

Step 407: After identifying the RAND and the AUTN included in the user authentication request message (step 406), the terminal 420 may calculate a SQN and the XMAC according to the calculation as set forth in Step 305, for example. If the terminal 420 determines that a MAC is not equal or does not match the XMAC, the reason for the failure of the record is "MAC failure." If the MAC matches the XMAC, the AUTN is verified.

If the SQN is less than or equal to a terminal SQN, the record failure cause value is "Sync failure." Based on this determination, the terminal 420 may calculate a new authentication token (AUTS), represented by AUTS=concatenation (conc) (terminal SQN)||MAC S, where Conc (terminal SQN)=terminal SQN⊕F5*K (RAND), MAC S=F1*K (terminal SQN||RAND||AMF).

If the failure cause value indicates a MAC failure, the terminal 420 may calculate S, which is represented by S=KDF (failure cause value||AUTN, KAMF or KNAS-enc), or S=KDF (failure reason value||AUTS, KAMF or KNAS-enc), or S=KDF (failure cause value ||AUTN||AUTS, KAMF or KNAS-enc). In an embodiment, the terminal 430 may generate a random number RANDa that is the same length as AUTN, S=KDF (failure reason value ||RANDa, KAMF or KNAS-enc), or S=KDF (failure reason value||RANDa||AUTS, KAMF or KNAS-enc) where KDF may be a 256-bit encryption function, KAMF may be an authentication function 1 key, and KNAS-enc is a non-access layer encryption key derived from KAMF key.

If the failure cause value indicates a Sync failure, the terminal 420 may calculate S, which is represented by S=KDF (failure cause value||AUTN, KAMF or KNAS-enc), or S=KDF (failure reason value||AUTS, KAMF or KNAS-enc), or S=KDF (Failure cause value ||AUTN||AUTS, KAMF or KNAS-enc). In an embodiment, the terminal 420 may generate a random number RANDa that is the same length as AUTN, S=KDF (failure reason value ||RANDa||AUTS, KAMF or KNAS-Enc), where KDF may be a 256-bit encryption function, KAMF is an authentication function 1 key, and KNAS-enc may be a non-access layer encryption key derived from KAMF.

The terminal 420 may transmit a user authentication failure message to authentication function 1 440. The user authentication failure message may include a failure reason value. In an embodiment, the user authentication failure message may include at least one of S, a SUCI, or AUTS.

After receiving the user authentication failure response, the authentication function 1 440 may decrypt S by using an encryption key (KAMF or KNAS-enc). The authentication function 1 440 can re-authenticate the authentication vector to the authentication service function/subscription data management function 460 according to the failure reason value in S. if the authentication fails at the terminal 420 for a predetermined number of times, the terminal 420 may reselect a new cell for re-registration.

Using the techniques as described here, a malicious node may not be able to decrypt the information provided in the user authentication failure response (step 407). Accordingly, the malicious node may not be able to track the terminal 420.

Figure 5:
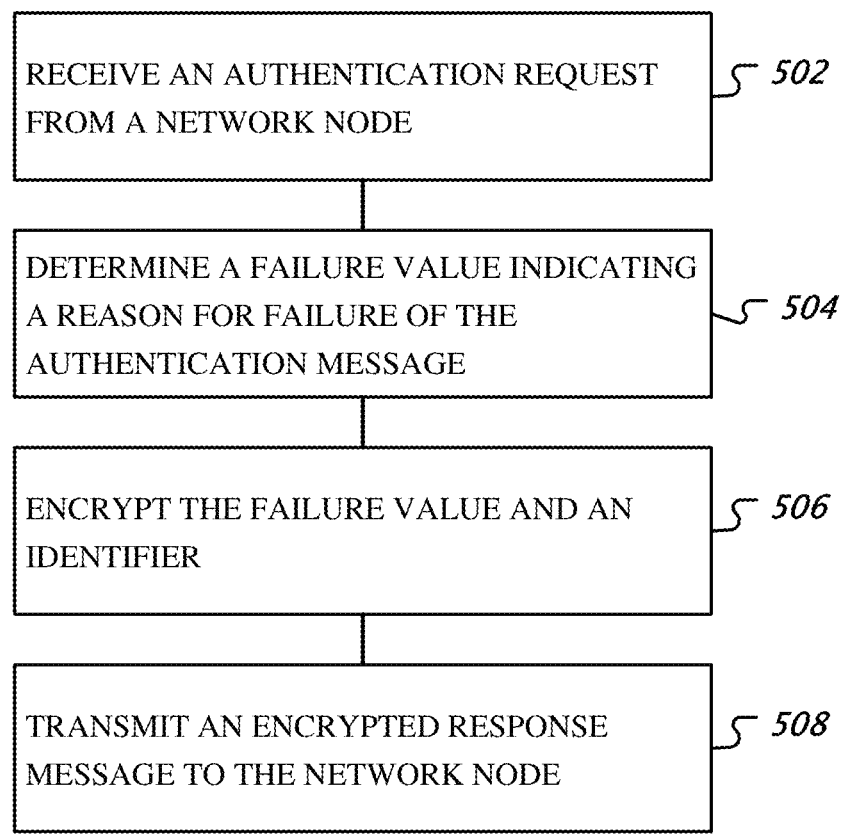
FIG. 5 illustrates a block diagram of a method for securing a user authentication process.

FIG. 5 illustrates a block diagram of a method for securing a user authentication process. A terminal may receive an authentication message from a network node, wherein the authentication message includes an authentication identifier (AUTN) and a random number (RAND) (block 502). The authentication message may include the user authentication request as described in Step 406 in example embodiment 1. The network node may include an authentication function 440 as described in example embodiment 1.

The terminal may determine a failure value indicating a reason for failure of the authentication message (block 504). The failure value may indicate a MAC failure or a Synchronization failure, as described in example embodiment 1. The terminal may encrypt the failure value and the identifier (block 506).

The terminal may transmit an encrypted response message to the network node, wherein the response message includes the encrypted failure value the identifier (block 508). The encrypted response message may include the user authentication failed message as described in Step 407 of example embodiment 1.

In some embodiments, the identifier includes the authentication identifier.

In some embodiments, the method includes generating a new authentication identifier (AUTS) based on the RAND, wherein the identifier includes the AUTS.

In some embodiments, the method includes generating a first encryption key, wherein the network node is configured to generate a second encryption key that matches the first encryption key, and wherein the first encryption key and second encryption key includes one of a non-access stratum encryption key (Knas-enc) and a mobility access control key (Kamf).

In some embodiments, the network node is configured to decrypt the encrypted response message using the encryption key to identify the failure value and the identifier.

In some embodiments, the method includes generating a new random number (RANDa) including a length equal to a length of the authentication identifier, wherein the indicator includes the RANDa.

In some embodiments, the failure value indicating the reason for the failure of the authentication message includes a synchronization error, and wherein the indicator includes the RANDa and the AUTS.

In some embodiments, the method includes identifying a message authentication code (MAC) based on the authentication identifier. The method may also include calculating an expected MAC (XMAC) based on the random number and the authentication identifier. The method may also include comparing the XMAC and a MAC, wherein the failure value indicating the reason for the failure of the authentication message includes a MAC failure based on determining that the XMAC does not match the MAC.

In some embodiments, the method includes calculating a sequence number (SQN) based on the authentication identifier and the random number. The method also includes comparing the SQN with a terminal SQN, wherein the failure value indicating the reason for the failure of the authentication message includes a synchronization error based on determining that the SQN is less than or equal to the terminal SQN.

In some embodiments, the method includes generating a subscriber concealed identifier (SUCI) by encrypting a subscriber permanent identifier (SUPI) using a public key, wherein the identifier includes the SUCI, and wherein the network node is configured to identify the SUPI by decrypting the SUCI using the private key.

In some embodiments, the network node is configured to generate a second authentication identifier and a second random number based on receiving the encrypted response message.

In some embodiments, the method includes receiving a second authentication message from the network node, wherein the second authentication message includes the second authentication identifier and the second random number.

In some embodiments, the method includes calculating a second XMAC based on the second random number and the second authentication identifier. The method also includes comparing the XMAC and a second MAC, wherein the second authentication message is verified based on determining that the second matches the second MAC.

In some embodiments, the method includes transmitting a registration request to the network node, wherein the request includes a cell identifier.

In some embodiments, the cell identifier includes at least one of: a user security capability, a SUCI and a 5G user temporary identifier (5G-GUTI 5G Globally Unique Temporary UE Identity).

In another embodiment, a method for wireless communication comprises transmitting an authentication request to a terminal, wherein the authentication request includes an authentication identifier (AUTN) and a random number (RAND). The method may also include receiving an encrypted response message from the terminal, wherein the response message includes an encrypted failure value indicating a reason for failure of the authentication message and an encrypted indicator. The method may also include decrypting the encrypted response message to determine the failure value and the indicator.

In some embodiments, the identifier includes the authentication identifier.

In some embodiments, the identifier includes a new authentication identifier (AUTS), wherein the terminal is configured to generate the AUTS based on the random number.

In some embodiments, the method includes generating a first encryption key, wherein the terminal is configured to generate a second encryption key that matches the first encryption key, and wherein the first encryption key and second encryption key includes one of a non-access stratum encryption key (Knas-enc) and a mobility access control key (Kamf).

In some embodiments, the identifier includes a new random number (RANDa) that includes a length equal to a length of the authentication identifier.

In some embodiments, the method includes determining that the failure value indicates a synchronization error, and wherein the indicator includes the RANDa and the AUTS.

In some embodiments, the terminal is configured to identify a message authentication code (MAC) based on the authentication identifier and calculate an expected MAC (XMAC) based on the random number and the authentication identifier, wherein the terminal is configured to determine that the XMAC does not match the MAC, and wherein the failure value indicates a MAC error based on the terminal determining that the XMAC does not match the MAC.

In some embodiments, the terminal is configured to calculate a sequence number (SQN) based on the authentication identifier and compare the SQN with a terminal SQN, wherein the failure value identifies a synchronization error based on determining that the SQN is less than or equal to the terminal SQN.

In some embodiments, the method includes identifying a subscriber permanent identifier (SUPI) by decrypting a subscriber concealed identifier (SUCI) using a private key, wherein the identifier includes the SUCI, and wherein the terminal is configured to generate the SUCI by encrypting the SUPI using the public key.

In some embodiments, the method includes determining that the SUPI is associated with the terminal using at least one of user data management (UDM) and an authentication vector that includes the authentication identifier and the random number.

In some embodiments, the method includes generating a second authentication identifier and a second random number based on decrypting the failure value, wherein the failure value indicates one of a MAC error and a synchronization error. The method may also include transmitting a second authentication request to the terminal, wherein the second authentication request includes the second authentication identifier and the second random number.

In some embodiments, the method includes receiving a second encrypted response message from the terminal, wherein the response message includes an encrypted success value indicating a successful authentication of the authentication message, an encrypted indicator. The method may also include decrypting the encrypted response message using the encryption key to determine the success value and the indicator.

In some embodiments, the method includes receiving a registration request from the terminal, wherein the request includes a cell identifier that includes at least one of: a user security capability, a SUCI, and a 5G globally unique temporary terminal identity (5G-GUTI).

Figure 6:
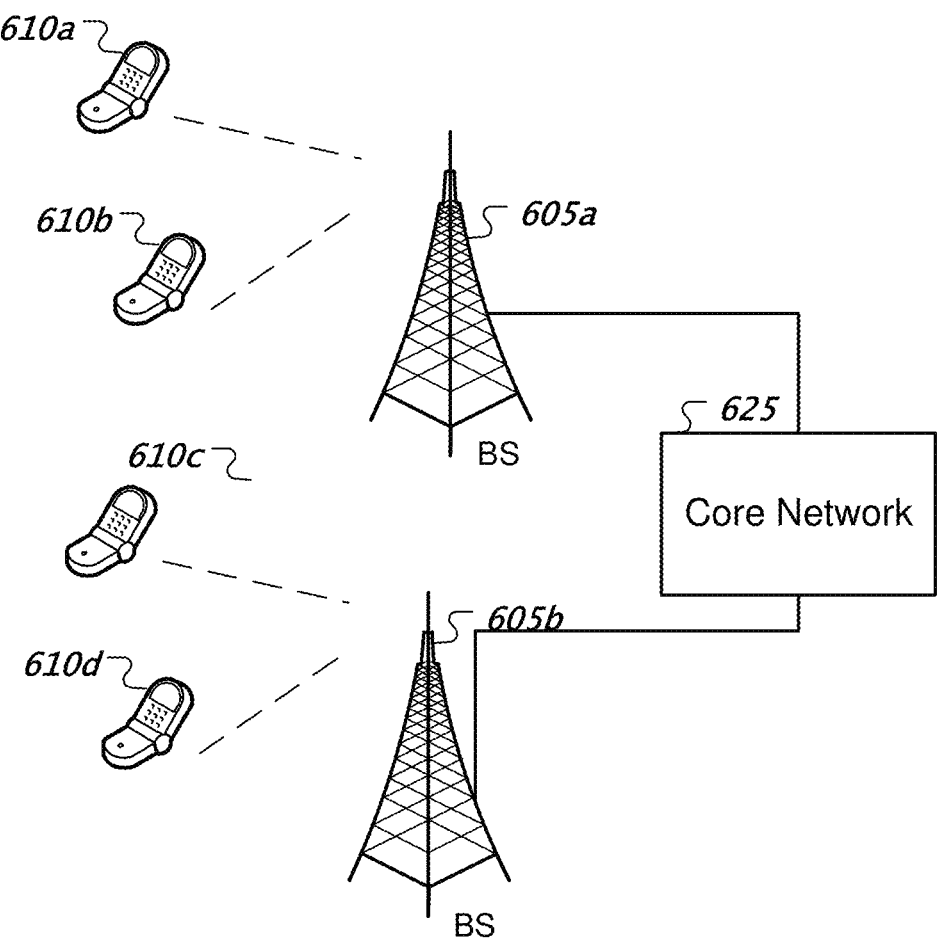
FIG. 6 shows an example of a wireless communication system where techniques in accordance with one or more embodiments of the present technology can be applied.

FIG. 6 shows an example of a wireless communication system where techniques in accordance with one or more embodiments of the present technology can be applied. A wireless communication system 600 can include one or more base stations (BSs) 605a, 605b, one or more wireless devices 610a, 610b, 610c, 610d, and a core network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors.

The core network 625 can communicate with one or more base stations 605a, 605b. The core network 625 provides connectivity with other wireless communication systems and wired communication systems. The core network may include one or more service subscription databases to store information related to the subscribed wireless devices 610a, 610b, 610c, and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The wireless devices 610a, 610b, 610c, and 610d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 7:
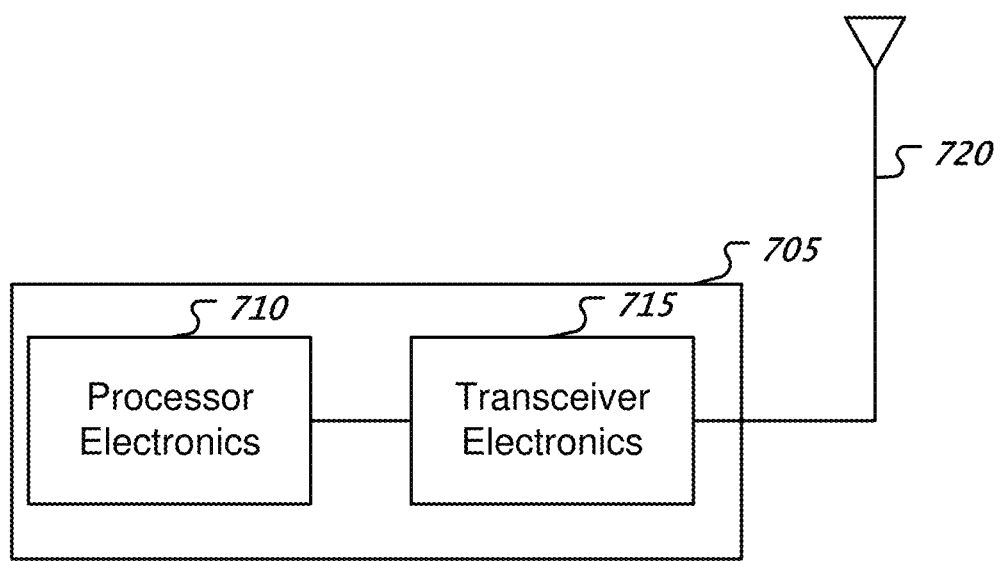
FIG. 7 is a block diagram representation of a portion of a hardware platform.

FIG. 7 is a block diagram representation of a portion of a hardware platform. A hardware platform 705 such as a network device or a base station or a wireless device (or UE) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 or a wireline interface. The hardware platform 705 can implement other communication interfaces with defined protocols for transmitting and receiving data. The hardware platform 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the hardware platform 705.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal, an authentication message from a network node, wherein the authentication message includes an authentication identifier (AUTN) and a random number (RAND);
   determining, by the terminal, a failure value indicating a reason for a failure of the authentication message;
   encrypting, by the terminal, the failure value and an identifier that includes the authentication identifier;
   transmitting, by the terminal, an encrypted response message to the network node, wherein the response message includes the encrypted failure value and the identifier; and
   reselecting a new cell for re-registration due to occurrence of the failure of the authentication message a predetermined number of times.

2. The method of claim 1, further comprising:
   generating, by the terminal, a new authentication identifier (AUTS) based on the RAND, wherein the identifier includes the AUTS.

3. The method of claim 1, further comprising:
   generating, by the terminal, a first encryption key, wherein the network node is configured to generate a second encryption key that matches the first encryption key, and wherein the first encryption key and second encryption key includes one of a non-access stratum encryption key (Knas-enc) and a mobility access control key (Kamf).

4. The method of claim 1, further comprising:
generating, by the terminal, a new random number (RANDa) including a length equal to a length of the authentication identifier, wherein the identifier includes the RANDa.

5. The method of claim 1, further comprising:
identifying, by the terminal, a message authentication code (MAC) based on the authentication identifier;
calculating, by the terminal, an expected MAC (XMAC) based on the random number and the authentication identifier; and
comparing, by the terminal, the XMAC and a MAC, wherein the failure value indicating the reason for the failure of the authentication message includes a MAC failure based on determining that the XMAC does not match the MAC.

6. The method of claim 1, further comprising:
calculating, by the terminal, a sequence number (SQN) based on the authentication identifier and the random number; and
comparing, by the terminal, the SQN with a terminal SQN, wherein the failure value indicating the reason for the failure of the authentication message includes a synchronization error based on determining that the SQN is less than or equal to the terminal SQN.

7. The method of claim 1, further comprising:
generating, by the terminal, a subscriber concealed identifier (SUCI) by encrypting a subscriber permanent identifier (SUPI) using a public key, wherein the identifier includes the SUCI, and wherein the network node is configured to identify the SUPI by decrypting the SUCI using a private key.

8. The method of claim 1, wherein the network node is configured to generate a second authentication identifier and a second random number based on receiving the encrypted response message.

9. The method of claim 1, further comprising:
transmitting, by the terminal, a registration request to the network node, wherein the registration request includes at least one of: a cell identifier, a user security capability, a SUCI, and a 5G user temporary identifier (5G-GUTI 5G Globally Unique Temporary UE Identity).

10. A method for wireless communication, comprising:
transmitting, by a network node, an authentication message to a terminal, wherein the authentication message includes an authentication identifier (AUTN) and a random number (RAND);
receiving, by the network node, an encrypted response message from the terminal, wherein the response message includes an encrypted failure value indicating a reason for failure of the authentication message and an identifier that includes the authentication identifier; and
decrypting, by the network node, the encrypted response message to determine the failure value and the identifier,
wherein, in a case that the failure of the authentication message occurs a predetermined number of times, a new cell is selected for re-registration.

11. The method of claim 10, wherein the identifier includes a new authentication identifier (AUTS), wherein the terminal is configured to generate the AUTS based on the random number.

12. The method of claim 10, further comprising:
generating, at the network node, a first encryption key, wherein the terminal is configured to generate a second encryption key that matches the first encryption key, and wherein the first encryption key and second encryption key includes one of a non-access stratum encryption key (Knas-enc) and a mobility access control key (Kamf).

13. The method of claim 10, wherein the identifier includes a new random number (RANDa) that includes a length equal to a length of the authentication identifier.

14. The method of claim 10, wherein a message authentication code (MAC) is identified based on the authentication identifier and an expected MAC (XMAC) is obtained based on the random number and the authentication identifier, wherein the failure value indicates a MAC error based on determining that the XMAC does not match the MAC.

15. The method of claim 10, wherein the terminal is configured to calculate a sequence number (SQN) based on the authentication identifier and compare the SQN with a terminal SQN, wherein the failure value identifies a synchronization error based on determining that the SQN is less than or equal to the terminal SQN.

16. The method of claim 10, further comprising:
identifying, by the network node, a subscriber permanent identifier (SUPI) by decrypting a subscriber concealed identifier (SUCI) using a private key, wherein the identifier includes the SUCI, and wherein the terminal is configured to generate the SUCI by encrypting the SUPI using a public key.

17. The method of claim 10, further comprising:
generating, by the network node, a second authentication identifier and a second random number based on decrypting the failure value, wherein the failure value indicates one of a message authentication code (MAC) error and a synchronization error; and
transmitting, by the network node, a second authentication message to the terminal, wherein the second authentication message includes the second authentication identifier and the second random number.

18. The method of claim 10, further comprising:
receiving, by the network node, a registration request from the terminal, wherein the registration request includes a cell identifier that includes at least one of: a user security capability, a SUCI, and a 5G globally unique temporary terminal identity (5G-GUTI).

19. An apparatus for wireless communication comprising processor electronics that is configured to carry out a method, comprising:
receiving an authentication message from a network node, wherein the authentication message includes an authentication identifier (AUTN) and a random number (RAND);
determining a failure value indicating a reason for a failure of the authentication message;
encrypting the failure value and an identifier that includes the authentication identifier; and
transmitting an encrypted response message to the network node, wherein the response message includes the encrypted failure value and the identifier,
wherein the apparatus is configured to reselect a new cell for re-registration upon occurrence of the failure of the authentication message a predetermined number of times.

20. The apparatus of claim 19, wherein the method further comprises:

generating, by the apparatus, a new authentication identifier (AUTS) based on the RAND, wherein the identifier includes the AUTS.

\* \* \* \* \*